June 3, 1941.   C. D. CHASE   2,244,099
ROTARY CUTTER
Filed June 29, 1940   2 Sheets-Sheet 1

Inventor
CHAUNCY D. CHASE
By
Attorney

June 3, 1941.  C. D. CHASE  2,244,099
ROTARY CUTTER
Filed June 29, 1940  2 Sheets-Sheet 2
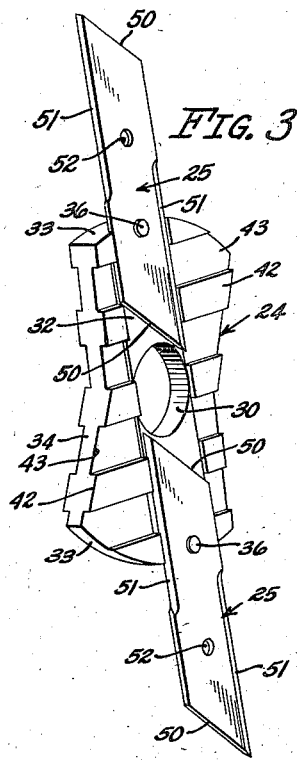
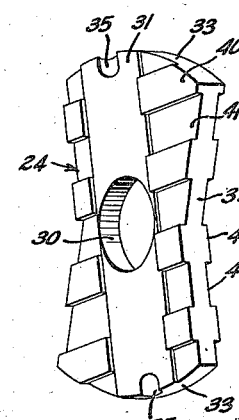
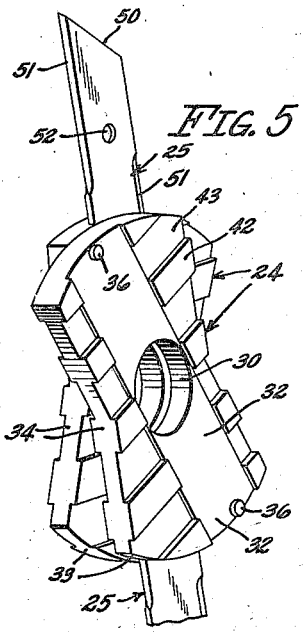
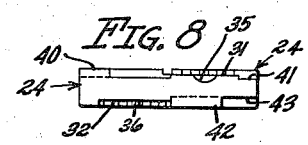
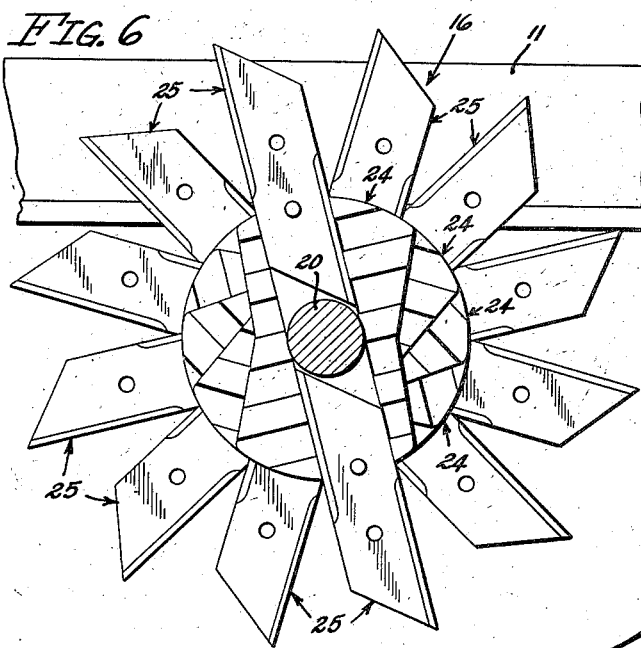
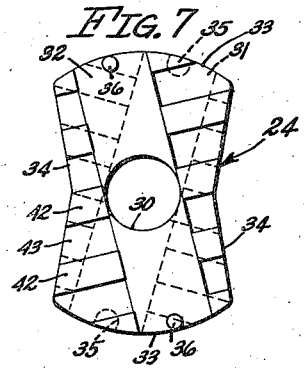
INVENTOR
CHAUNCY D. CHASE
BY
ATTORNEY Patented June 3, 1941

2,244,099

UNITED STATES PATENT OFFICE 2,244,099

ROTARY CUTTER

Chauncy D. Chase, Los Angeles, Calif., assignor to Food Machinery Corporation, San Jose, Calif., a corporation of Delaware Application June 29, 1940, Serial No. 343,243

12 Claims. (Cl. 97—215)

This invention relates to rotary cutters and has particularly utility in lawn renovators.

Lawns are subject to the growth of noxious weeds and grasses which during one or more seasons of the year tend to choke the other more beautiful grasses, and it is current practice to go over the lawns in these seasons with a power tool called a renovator which cuts the roots of the noxious grasses and gives the other grasses a new lease on life, making the lawn again green and beautiful. A common type of renovator used for this purpose includes a light carriage which can be maneuvered by hand and on which is mounted a rotary cutter and a gasoline engine for rotating this.

Operating as they do in the soil, the cutting blades of these rotary cutters must be sharpened frequently to maintain their efficiency.

It is an object of this invention to provide a rotary cutter for lawn renovating having such characteristics as will facilitate the blades thereof being maintained in sharpened condition.

It is a further object of my invention to provide such a rotary cutter, the construction and assembly of which will facilitate the ready replacement of each of the cutting blades thereof by a sharpened blade or the re-assembly of said cutting blades with the rotary cutter to present new and freshly sharpened cutting edges on said blades to the lawn surfaces to be renovated.

It is yet another object of my invention to provide such a rotary cutter in which the replacing or repositioning of individual cutting blades in said rotary cutter may be carried out successively without losing the other cutter blades from the cutter during the operation.

It is a further object of the invention to provide a cutting blade for use in a rotary cutter which, after having become dulled by use, may be caused to present a freshly sharpened cutting edge to the work upon being repositioned in said rotary cutter.

The manner of accomplishing the foregoing objects, as well as further objects and advantages, will be made manifest in the following description taken in connection with the following drawings, in which:

Fig. 3 is a perspective view of one of the mounting plates of the invention disassembled from the rest of the rotary cutter and with two cutting blades properly positioned relative to said plate.

Fig. 4 is a view of the reverse face of another mounting plate positioned as it is about to be applied to the mounting plate shown in Fig. 3 to entrap the cutting blades shown in Fig. 3.

Fig. 5 is a view illustrating the assembly of the two mounting plates and cutting blades illustrated in Figs. 3 and 4.

Fig. 6 is a cross-sectional view taken on the line 6—6 of Fig. 2 and showing the radial relationships of the various mounting plates and cutting blades of said rotary cutter when assembled.

Fig. 7 is a face view of one of said mounting plates illustrating in full lines the interlocking lugs provided on the near face of said plate and in broken lines the interlocking lugs on the reverse face of said plate.

Fig. 8 is a plan view of Fig. 7, showing a blade engaging tit formed on one face of said plate and a recess formed on the opposite face of said plate for receiving such a tit of an adjacent plate when these plates are assembled together.

Figure 1:
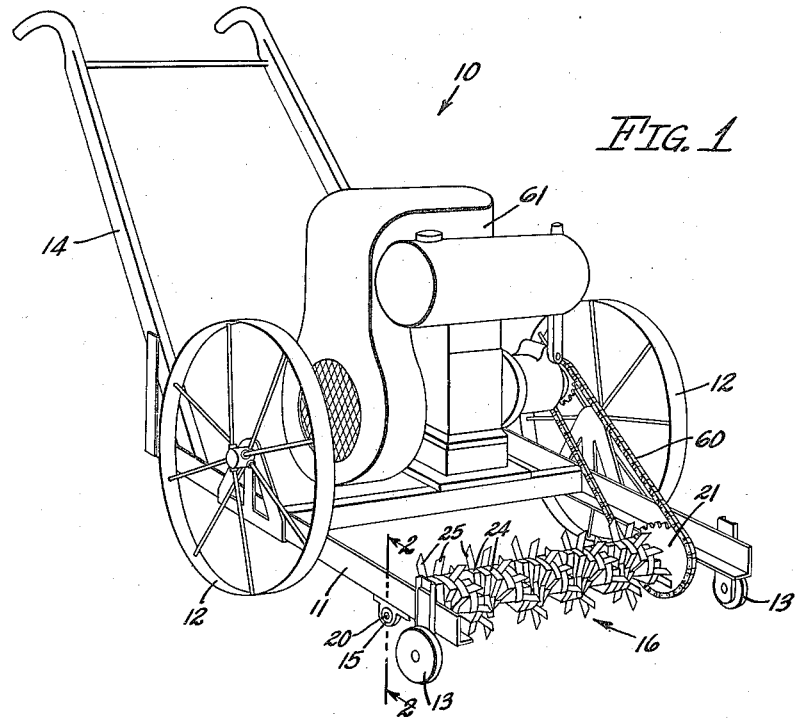
Fig. 1 is a perspective view of a lawn renovator embodying the rotary cutter of my invention.

The renovator 10 shown in Fig. 1 includes a frame 11 supported on main wheels 12 and small vertically adjustable wheels 13. The renovator is adapted to be manually propelled and guided by a set of handles 14. Pivotally mounted on bars 15 provided on the frame 11 just back of the wheels 13, is a rotary cutter 16.

The cutter 16 includes a mandrel 20 having a sprocket 21 fixed on one end thereof, while the other end is threaded and receives a nut 22 and washer 23. Assembled on the mandrel 20 and locked in place thereon between the washer 23 and the sprocket 21 is a series of cutter mounting plates 24 and a series of cutting blades 25. The construction of the plates 24 and blades 25 is clearly illustrated in Figs. 3 to 8 inclusive of the drawings.

Each plate 24 has a central opening 30 for receiving the mandrel 20. Extending radially from the opening 30 on opposite sides of the mounting plate are flat cutter blade gripping faces 31 and 32. End edges 33 of each plate 24 are preferably concentric with the axis of the hole 30, while side edges 34 are formed as by taking concave sections from a disc of a diameter represented by the curved end surfaces 33.

Formed in opposite ends of the gripping faces 31 are recesses 35, while oppostie ends of the gripping faces 32 are provided with tits 36. The faces 31 and 32 are offset relative to each other about the axis of the opening 30 as clearly shown in Fig. 7. Formed alongside and at right angles to the gripping faces 31 is a series of lugs 40 and recesses 41. A similar series of lugs 42 and recesses 43 is provided on the opposite face of the plate 24 alongside and at right angles with the gripping faces 32.

Figure 2:
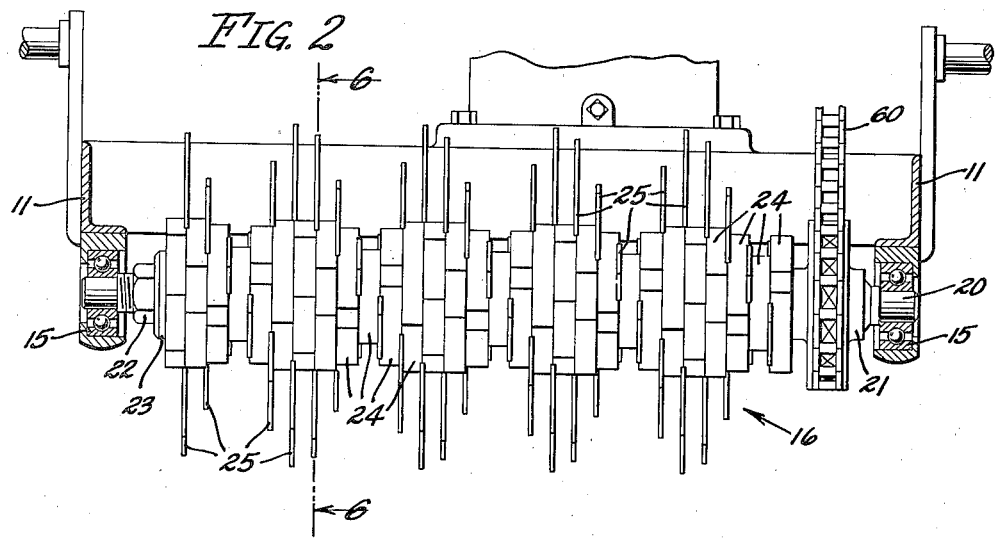
Fig. 2 is an enlarged cross-sectional view taken on the line 2—2 of Fig. 1 and presenting a front elevational view of the rotary cutter of my invention.

When the plates 24 are assembled as shown in Fig. 2, the tits 36 extend into the recesses 35, the lugs 40 extend into the recesses 43 and the lugs 42 extend into the recesses 41. The lugs 40 thus inter-lock with the lugs 42 so as to prevent rotation of any of the plates 24 about the mandrel 20 relative to any of the other plates.

Each of the cutter blades 25 comprises a flat sheet of metal having oblique end faces 50 with sharpened side edges 51 adjacent the acute angles of the end faces 50 and on opposite sides of the blade 25. Provided in each of these blades is a pair of holes 52. Each of these blades is adapted to have one end thereof inserted between an adjacent pair of plates 24 when the latter are not tightly assembled together, the holes 52 being so located that one of these holes is disposed to receive the tit 36 of the adjacent face 32 when the blade is thus inserted (as shown in Figs. 3 and 5).

After all the blades 25 are thus inserted into the pocket-like spaces provided between adjacent plates 24, the nut 22 is tightened up, thus clamping all of the plates 24 together and rigidly uniting the cutter blades 25 with the rotary cutter 16.

In operating the renovator 10, the rotary cutter 16 is rotated continuously at a high rate of speed through an endless chain 60 by a power plant 61 mounted on the frame 11. Owing to the cutter blade gripping faces 31 and 32 on opposite sides of each of the plates 24 being offset circumferentially relative to each other, as shown in Fig. 7, the blades 25, when assembled in the rotary cutter 16 as above described, are disposed helically in two helical groups about the axis of the cutter. This arrangement distributes the load uniformly on the power plant 61 throughout each revolution of the cutter 16.

It is desired to point out that in operating the renovator equipped with the rotary cutter 16 of my invention, the cutting blades 25 may be caused to present a freshly sharpened cutting edge by loosening up on the nut 22 and prying any adjacent pair of plates 24 slightly apart so that the blade 25 adjacent the point at which these plates are pried apart may be removed, turned end-for-end, and replaced in the assembly; or, if both ends of this blade have been dulled an entirely new blade or one newly sharpened may be substituted in the assembly for the blade which was removed. The holes 30 are sufficiently large so that the plates 24 may be cocked slightly relative to each other so as to spread certain ends of a pair of adjacent plates to remove and reverse or replace the blade trapped between these ends without any danger of the accidental loss of any of the other blades from their place in the rotary cutter 16. When the renewing or rearranging of the cutter blades 25 in the cutter 16 has been completed, the nut 22 may be quickly tightened and operation with the renovator 10 resumed.

It is thus seen that I have provided a rotary cutter which has great utility when used in a lawn renovator and which attains all of the objects and advantages of the invention set forth hereinabove.

While I have disclosed herein only a single form of the invention, it is to be understood that various changes and modifications may be made in this without departing from the spirit of the invention or the scope of the appended claims.

What I claim is:

1. In a rotary cutter, the combination of: a mandrel; a series of cutter blades; a series of cutter mounting plates, each of which has an opening through which said mandrel extends; and lugs formed on the opposite faces of each of said plates for interlocking engagement with the lugs of the adjacent plates when said plates are assembled snugly face-to-face on said mandrel to prevent rotation of said plates relative to each other on said mandrel after being so assembled, said lugs on each pair of adjacent faces of said plates co-operating to form a pocket for receiving and retaining one of said cutting blades in proper assembled relation with said rotary cutter.

2. A combination as in claim 1, in which said pockets are disposed substantially radially from said mandrel and said lugs are disposed substantially at right angles to said pockets.

3. In a rotary cutter, the combination of: a mandrel; a series of cutter blades; a series of cutter mounting plates, each of which has an opening through which said mandrel extends; inter-locking lugs formed on the opposite faces of each of said plates for interlocking engagement with the lugs of the adjacent plates when said plates are assembled snugly face-to-face on said mandrel to prevent rotation of said plates relative to each other on said mandrel after being so assembled, said lugs on each pair of adjacent faces of said plates co-operating to form a pocket for receiving and retaining one of said cutting blades in proper assembled relation with said rotary cutter, there being recess means formed in each of said blades; and means provided on said plates for extending into said recess means of said blades so as to lock said blades in said pockets when said rotary cutter is assembled.

4. In a rotary cutter, the combination of: a mandrel; a series of cutting blades, each of said cutting blades having a recess therein; a series of cutter mounting plates having openings adapted to receive said mandrel so as to assemble said mounting plates face-to-face on said mandrel; inter-locking means formed on the meeting faces of said plates which inter-lock to prevent rotation of said plates on said mandrel relative to each other when said plates are so assembled, said inter-locking means accommodating the insertion of a blade between each pair of adjacent faces of the plates; and means on said plates adapted to extend into said recesses in said cutter blades to lock the latter against removal from between said plates.

5. In a rotary cutter, the combination of: a mandrel; a series of cutting blades; a series of cutter mounting plates having openings adapted to receive said mandrel for assembling said plates on said mandrel; and inter-locking means formed on each face of each of said plates which inter-locks with the inter-locking means on an adjacent plate to prevent rotation of said plates relative to each other when assembled on said mandrel, there being spaces provided on the faces of said plates to form a pocket between each adjacent pair of faces for receiving and retaining one of said cutting blades when said plates are assembled on said mandrel as aforesaid.

6. In a rotary cutter, the combination of: a mandrel; a series of cutting blades; a series of cutter mounting plates having openings adapted to receive said mandrel for assembling said plates on said mandrel; and inter-locking means formed on each face of each of said plates which inter-locks with the inter-locking means on an adjacent plate to prevent rotation of said plates relative to each other when assembled on said mandrel, there being spaces provided on the faces of said plates to form a pocket between each adjacent pair of faces for receiving and retaining one of said cutting blades when said plates are assembled on said mandrel as aforesaid, said pockets having a helical relation with each other relative to said mandrel when said plates are assembled on said mandrel.

7. In a rotary cutter, the combination of: a mandrel; a series of cutting blades; a series of cutter mounting plates having openings adapted to receive said mandrel for assembling said plates on said mandrel; inter-locking means formed on each face of each of said plates which inter-locks with the inter-locking means on an adjacent plate to prevent rotation of said plates relative to each other when assembled on said mandrel, there being spaces provided on the faces of said plates to form a pocket between each adjacent pair of faces for receiving and retaining one of said cutting blades when said plates are assembled on said mandrel as aforesaid, said pockets having a helical relation with each other relative to said mandrel when said plates are assembled on said mandrel, and inter-engaging means on said blades and said plates for retaining said blades in said pockets when said plates are assembled as aforesaid on said mandrel.

8. In a rotary cutter, the combination of: a mandrel; a series of cutting blades; a series of mounting plates having central apertures through which said mandrel extends to assemble said plates face-to-face; inter-locking means formed upon each pair of the meeting faces of said plates to inter-lock and prevent rotation of said plates relative to each other when so assembled, there being two pockets provided in each pair of meeting faces of said plates, said two pockets extending in opposite directions from said mandrel; and inter-engaging means formed on said plates and said blades for retaining said blades in said pockets when said rotary cutter is assembled, said plates being sufficiently loose on said mandrel when not tightly pressed together along the axis of said mandrel to permit adjacent faces of any pair of said plates to be separated to effect a removal and replacement of a cutter blade from between said ends without disengaging said inter-engaging means at the opposite ends of said pair of plates.

9. In a rotary cutter, the combination of: a mandrel; a series of cutting blades; a series of mounting plates having central apertures through which said mandrel extends to assemble said plates face-to-face; inter-locking means formed upon each pair of the meeting faces of said plates to interlock and prevent rotation of said plates relative to each other when so assembled, there being two pockets provided in each pair of meeting faces of said plates, said two pockets extending in opposite directions from said mandrel; and inter-engaging means formed on said plates and said blades for retaining said blades in said pockets when said rotary cutter is assembled, said pockets and the blades mounted therein being disposed in two opposed helical paths relative to said mandrel.

10. In a rotary cutter, the combination of: a mandrel; a series of double-ended cutter blades suitably sharpened and shaped at their opposite ends for performing a cutting action; and means for mounting said blades on said mandrel by gripping one of the sharpened ends of each of said blades to cause the other sharpened ends of said blades to extend outwardly about said mandrel in a helical arrangement relative thereto, said last mentioned means being readily operable to release one or more of said blades to permit it to be replaced by another blade or to permit said blade to be re-assembled with said rotary cutter by reversing said blade end-for-end and engaging said mounting means with the end of said blade previously extending outwardly therefrom.

11. In a rotary cutter, the combination of: a mandrel; a series of uniformly double-ended cutting blades, each blade having cutting edges formed on opposite end portions of said blade on opposite sides thereof, the end edges of said blade being obliquely disposed relative to the axis of the blade; means for mounting said blades on said mandrel to extend substantially radially therefrom, one of the oblique end faces of each of said blades being disposed close to said mandrel so as to rest thereagainst under operating conditions where suitable pressure is brought to bear on the cutting edge disposed on the outer end of said blade.

12. A cutter blade suitable for use in a rotary cutter, comprising: a piece of sheet metal, each of the edges of said blade being provided with a sharpened portion, said sharpened portions being at opposite ends of the blade, end faces of said blade being parallel and obliquely disposed relative to the longitudinal axis of the blade, duplicate apertures being provided in oppoiste end portions of said blade, each of said apertures being adapted to provide means for locking said blade on a mounting means to permit the sharpened edge of the opposite end of the blade to be exposed for cutting engagement with the work.

CHAUNCY D. CHASE.